United States Patent
Brown et al.

[11] 3,797,771
[45] Mar. 19, 1974

[54] METHOD AND APPARATUS FOR WINDING METALLIZED-TYPE CAPACITORS

[75] Inventors: Donald R. Brown, Downers Grove; Otto T. Masopust, Jr., Claredon Hills, both of Ill.

[73] Assignee: Western Electric Company, Incorporated, New York, N.Y.

[22] Filed: Feb. 25, 1971

[21] Appl. No.: 118,602

[52] U.S. Cl............ 242/56.1, 29/25.42, 235/151.13, 242/7.03, 242/7.12, 324/57
[51] Int. Cl............................................. H01g 13/02
[58] Field of Search ....... 242/7.03, 7.12, 56.1, 7.02; 235/151.13; 324/57; 29/25.41, 25.42

[56] References Cited
UNITED STATES PATENTS

| | | | |
|---|---|---|---|
| 3,432,901 | 3/1969 | Fanning | 242/56.1 X |
| 3,459,616 | 8/1969 | DuPuis | 242/56.1 X |
| 3,073,008 | 1/1963 | McGraw, Jr. | 29/25.42 |
| 1,789,451 | 1/1931 | Rosaire et al. | 29/25.42 |
| 3,473,750 | 10/1969 | Bayard, Jr. | 242/56.1 |
| 2,767,914 | 10/1956 | Merrill et al. | 235/151.13 |
| 3,082,373 | 3/1963 | Hooke et al. | 324/57 |
| 3,208,051 | 9/1965 | Tarchini | 235/151.13 |
| 3,222,504 | 12/1965 | Arnold et al. | 235/151.13 |
| 3,471,685 | 10/1969 | Bishop | 235/151.13 |
| 3,445,071 | 5/1969 | Kezer et al. | 242/7.03 |

*Primary Examiner*—Billy S. Taylor
*Attorney, Agent, or Firm*—R. A. Lloyd

[57] ABSTRACT

Two capacitor forming strips are wound to provide a capacitor roll having a given capacitance value. The resistance, the capacitance, and the number of winding turns applied to the capacitor roll being wound are monitored during winding, the average required number of strip winding turns to provide a capacitance of the given value being known. A minus and a plus limit are assigned to the average required number of winding turns, and winding of the capacitor roll is terminated if either the monitored resistance of the capacitor is below a predetermined resistance value, if at the minus turns limit the capacitance value is greater than the given value, if at the plus turns limit the capacitance value is less than the given value, or if the capacitor reaches the given capacitance value when the number of turns wound on the capacitor roll is within the minus and plus limits of turns.

6 Claims, 6 Drawing Figures

PATENTED MAR 19 1974 3,797,771
SHEET 1 OF 2
FIG. 1
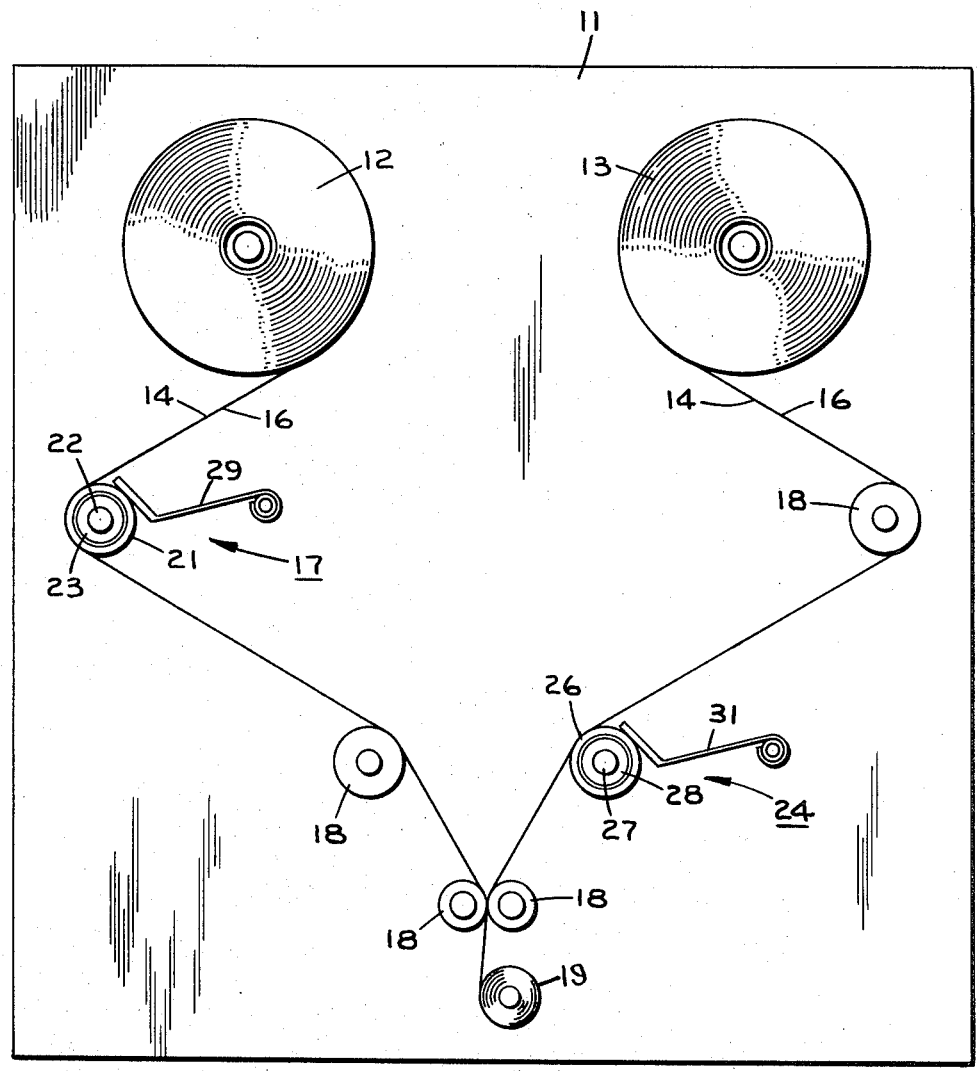
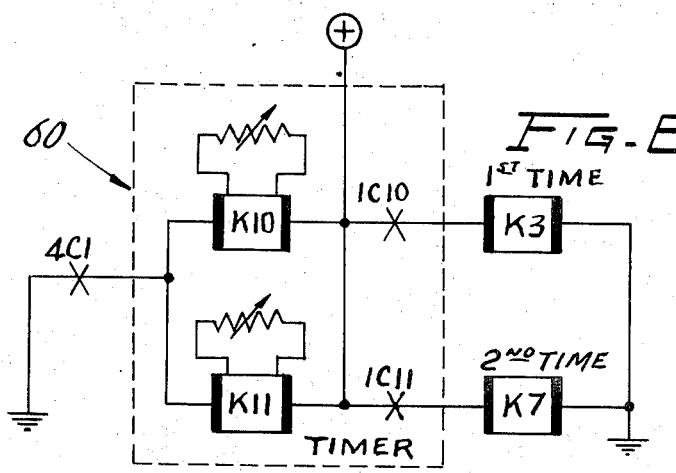
FIG. 6
INVENTORS
D. R. BROWN
O. T. MASOPUST
BY Robert A. Lloyd
ATTORNEY

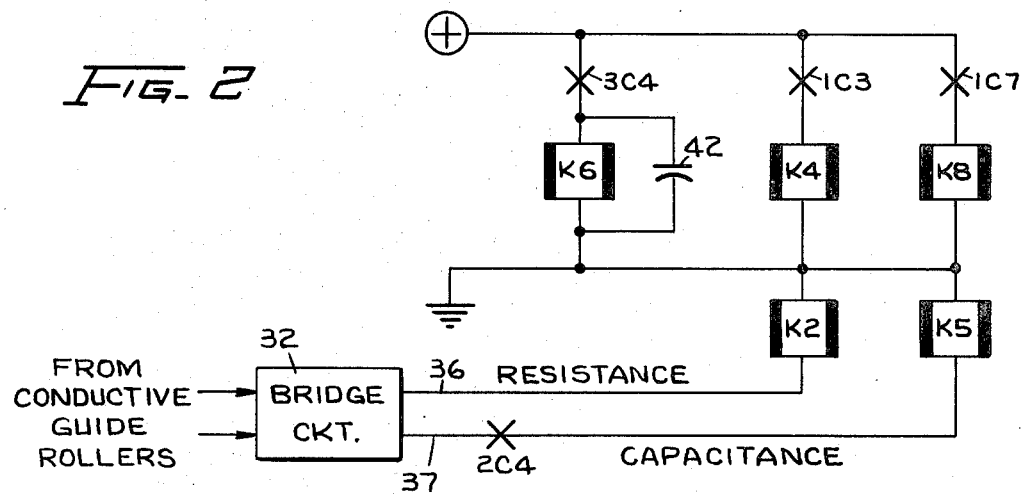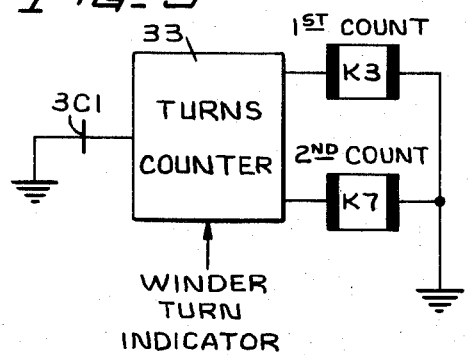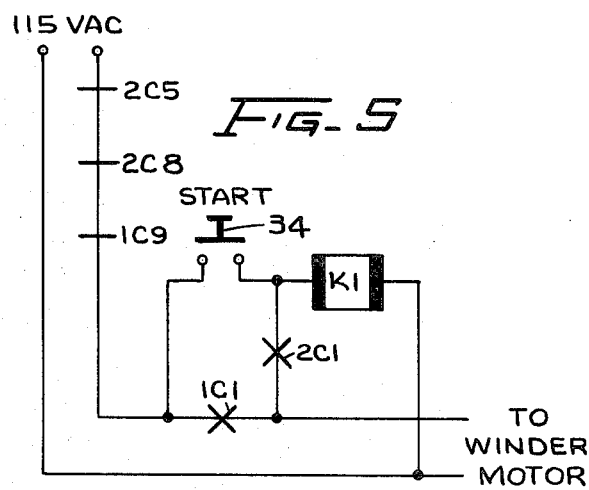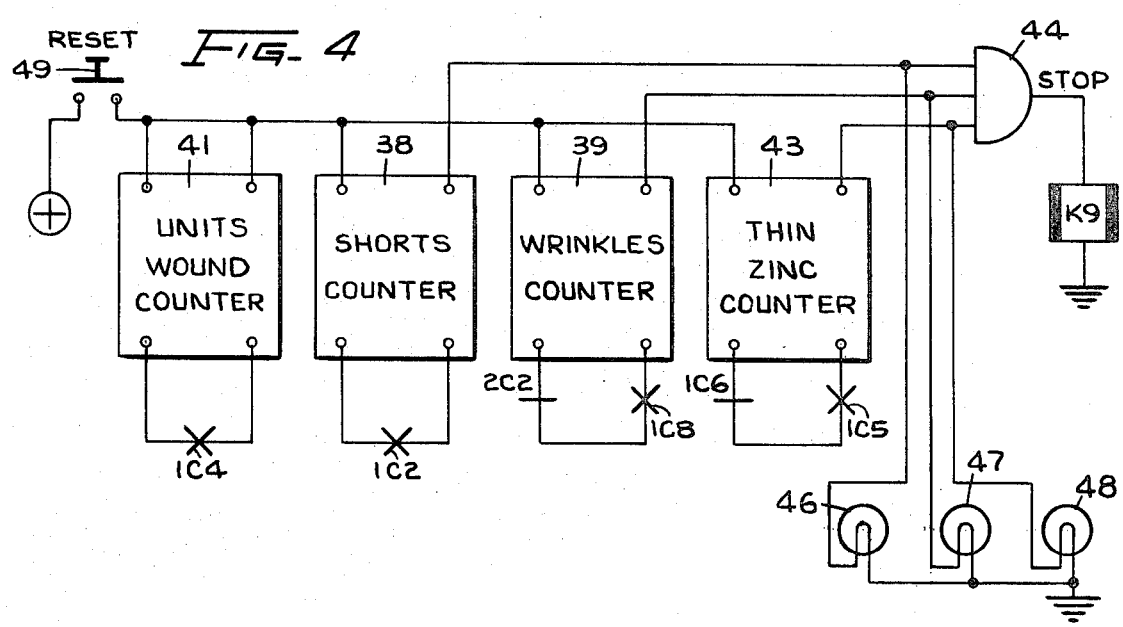

METHOD AND APPARATUS FOR WINDING METALLIZED-TYPE CAPACITORS

BACKGROUND OF THE INVENTION

1. Field of the Invention

The present invention relates to capacitor winding apparatus and to methods of winding capacitors, and in particular to a method and apparatus for winding metallized-type capacitors to close tolerances.

2. Description of the Prior Art

In the manufacture of capacitors from metallized strips where the capacitors are wound to a fixed number of turns, such capacitors may be fabricated to a close tolerance if the thickness of the metallized strip is uniform. However, where the strip varies in thickness, the capacitance of such a capacitor will likewise vary over a wide range. To compensate for such variations, a capacitance sensing device may be employed in the winding apparatus to monitor the capacitance of the unit being wound and to terminate winding of the capacitor when the capacitance value reaches a predetermined value without regard to the number of strip winding turns applied thereto. Additionally, a monitor may be employed to count the number of strip winding turns applied to a capacitor being wound to terminate winding of the capacitor when a predetermined number of turns have been applied to the capacitor, without regard to the monitored value of the capacitance, to prevent prolonged winding of the capacitor which would eventually result in damage to the winding apparatus if the given value of capacitance were not reached. In such a case, the termination of winding is an indication that the strip windings applied to the capacitor roll are wrinkled and that an unreasonably large number of winding turns would be required to reach the predetermined, or given, capacitance value.

Such a method and apparatus for winding capacitor rolls from metallized strips does not, however, detect a capacitor which is wound to the given capacitance value with a number of strip winding turns less than the average number of strip winding turns that would be required to obtain the given capacitance value if the capacitor were properly wound with a metallized strip having a uniform thickness. Such a capacitor is indicative that either one or both of the metallized strips comprising the capacitor is formed of either or both a thin dielectric material or a thin metallized coating which is applied thereto. A thin dielectric material results in a wound capacitor having a low dielectric breakdown voltage and a thin metallized coating has a greater permeability to moisture than a thick coating. Also, such an apparatus and method does not detect a capacitor having a resistance value less than a predetermined value nor provide means for detecting repetitious common defects that occur in the capacitor winding operation that could be corrected by an operator adjustment of the capacitor winding machine if the occurrence of a predetermined number of a particular type of defect in the winding of a capacitor in a given capacitor sample size were brought to the operator's attention.

An object of the invention is to provide a method and apparatus for stopping the winding of a capacitor roll if a given capacitance value is obtained before a predetermined number of winding turns, less than the average required number of winding turns, have been wound thereon.

Another object of the invention is to stop the winding of a capacitor roll if the resistance between the plates thereof is less than a predetermined resistance value.

A further object of the invention is to terminate the winding of additional capacitors when a predetermined number of capacitors of a given sample size have a particular defect.

A still further object of the invention is to provide a plurality of capacitor rolls having at least a predetermined minimum reliability.

SUMMARY OF THE INVENTION

In accordance with the present invention, a capacitor roll is formed by winding capacitor-forming strips while both monitoring the capacitor value of the capacitor being wound and determining the number of strip winding turns applied thereto. Winding of the capacitor is stopped when a first predetermined number of strip winding turns have been applied thereto, if at that time the monitored capacitance value is greater than the predetermined capacitance value. If at that time the monitored capacitance value is less than the predetermined value, the winding is stopped when the monitored capacitance value is at the predetermined value.

Preferably, the average required number of strip winding turns to obtain a given capacitance value from a capacitor roll formed from capacitor-forming strips is predetermined. A capacitor is then wound while monitoring the number of strip winding turns applied thereto and the resistance value thereof. The capacitance value of the capacitor being wound is monitored in response to the monitored number of turns being at least equal to the first predetermined number of turns, the first predetermined number of turns being less than the average required number of turns. Winding of capacitor is stopped when the monitored value of the resistance of the capacitor is less than a predetermined resistance value or when the monitored number of turns reaches the first predetermined number of turns, if at that point the monitored value of the capacitance is greater than the given capacitance value. Winding of the capacitor is also stopped when the monitored number of turns reaches a second predetermined number of turns, the second predetermined number of turns being greater than the required average number of turns, if at that point the monitored value of the capacitance is less than the given capacitance value, or when the monitored value of the capacitance reaches the given value of capacitance, if at that point the monitored number of turn windings is within the first and second predetermined number of turn windings.

The number of capacitors having a monitored capacitance value greater than the given value when the monitored number of turns is equal to the first predetermined number of turns is counted to generate a first count, and the number of capacitors having a capacitance value less than the given value when the monitored number of turns is equal to the second predetermined number of turns is counted to generate a second count. Winding of further capacitors is terminated when the first count equals a predetermined number or when the second count equals a preselected number.

Other objects, advantages and features of the invention will be apparent upon consideration of the following detailed description when taken in conjunction with the appended drawings.

BRIEF DESCRIPTION OF THE DRAWINGS

FIG. 1 is a partial front view of an apparatus for winding capacitors in accordance with the method of the present invention;

FIGS. 2-5 form a logic diagram of a capacitor winding system embodying the present invention and FIG. 6 is an alternate embodiment of the logic diagram shown in FIG. 3.

DETAILED DESCRIPTION

The embodiment of the invention shown in FIG. 1 of the drawings includes a front plate 11 of a capacitor winding apparatus having two capacitor-forming metallized strip supply reels 12 and 13 rotatably carried thereon. The metallized strip from each of the supply reels 12 and 13 is comprised of a dielectric strip 14 having a conductive material 16, zinc in the instant example, carried thereon. The metallized strip from the reel 12 passes over a first guide roller 17 and around two guide rollers 18 to a winding arbor 19, the metallized portion 16 of the strip from the supply reel 12 being maintained in electrically conductive engagement with an electrically conductive peripheral portion 21 of the guide roller 17. The electrically conductive peripheral portion 21 is separated from a rotatable support 22 by an electrically nonconductive member 23.

The metallized strip from the supply reel 13 passes over two guide rollers 18 and around a guide roller 24 to the winding arbor 19, where it is wound into a capacitor roll with the metallized strip from the supply reel 12. The metallized side 16 of the strip provided by the supply reel 13 is maintained in electrically conductive engagement with an electrically conductive peripheral portion 26 of the guide roller 24, the peripheral portion 26 being separated from a rotatable support member 27 by an electrically insulating member 28.

Two electrical brushes 29 and 31 are maintained in electrically conductive engagement with the conductive peripheral portions of the guide rollers 17 and 24, respectively, to provide an input, representative of the impedance of the capacitor roll being wound at the arbor 19, to a bridge circuit 32 shown in FIG. 2 of the drawings. A conventional sensing device provides an input to a turns counter 33, shown in FIG. 3, in response to each revolution of the arbor 19 provided by a conventional winder motor (not shown). Each revolution of the arbor 19 represents one strip winding turn applied to the capacitor roll.

The turns counter 33 is a Veeder-Root Form No. 183503-505 counter, and is programmable to provide a first output in response to a first predetermined number of inputs applied thereto and to provide a second output in response to a second predetermined number of inputs applied thereto, the first predetermined number of inputs (representing a like number of stip winding turns) being less than, and the second predetermined number of inputs (representing a like number of strip winding turns) being greater than, the average number of strip winding turns required to wind a capacitor to a given capacitance value. The average number of required turns is determined by winding a plurality of capacitors to a given capacitance value and determining the average number of strip winding turns required to wind each capacitor to the given value.

The first predetermined number of inputs to the turns counter 33 is chosen such that, if a capacitor has a capacitance value greater than the given value when the number of winding turns applied thereto is equal in number to the first predetermined number of inputs, it is assumed that either one or both of the metallized strips comprising the capacitor roll is thinner than required and that the capacitor formed therefrom is unacceptable. The second predetermined number of inputs to the turns counter 33 is chosen such that, if a capacitor has a capacitance value less than the given capacitance value when the number of winding turns applied thereto is equal in number to the first predetermined number of turns, it is assumed that the metallized strips comprising the capacitor roll are wrinkled and that the capacitor is unacceptable.

The output from the bridge circuit 32 is applied to a plurality of relays which are responsive to both the output from the bridge circuit 32 and to the output from the turns counter 33 to terminate the winding of a capacitor if (a) the monitored resistance value of the capacitor is less than a predetermined resistance value, (b) the monitored capacitance value of the capacitor is greater than the given capacitance value when the turns counter 33 provides the first output at the first predetermined number of turns, (c) the monitored capacitance value of the capacitor is less than the given capacitance value when the turns counter 33 provides the second output at the second predetermined number of turns, or (d) the capacitance is at the given capacitance value after the turns counter 33 has provided the first output at the first predetermined number of turns and before the turns counter provides the second output at the second predetermined number of turns.

Counting circuitry, shown in FIG. 4, operates to terminate the winding to successive capacitors whenever, in a given sample size, a first number of capacitors have a monitored resistance value less than the predetermined resistance value, whenever a second number of capacitors have a monitored capacitance value less than the given capacitance value at the the second predetermined number of turns, or whenever a third number of capacitors have a monitored capacitance value greater than the given capacitance value at the first predetermined number of turns. Each of the counters shown in FIG. 4 is a Durant Model No. 49600-402 counter, and is characterized in that an output is provided therefrom in response to a number of input signals applied thereto, the number of input signals being predetermined by prior programming of the counter. Each counter also has an input for resetting the counter in response to a reset signal applied thereto.

In particular, in response to a momentary closure of a push button switch 34, a relay K1, having three contacts 1C1, 2C1, 3C1, and 4C1 is energized. Energizing the relay K1 provides power to the winder motor through the closure of the contacts 1C1 to initiate the winding of a capacitor at the arbor 19, latches the relay K1 in an energized condition through the closure of the contacts 2C1, and resets the turns counter 33 to a zero count by opening of the contacts 3C1. In response to the winding of the capacitor at the arbor 19, an input is provided to the turns counter 33 to advance the counter 33 one count for each revolution of the arbor 19.

Simultaneously with a count being advanced into the turns counter 33, an input is applied from the brushes 29 and 31 to the bridge circuit 32, the bridge circuit 32 having two output conductors 36 and 37. The first output conductor 36 provides an indication of the resistance of the capacitor being wound and the second output conductor 37 provides an indication of the capacitance of the capacitor being wound. The bridge circuit 32 may be of a conventional type, and in the instant case is a Model No. 5332 Capacitor Winder Auto-Controller, provided by Micro Instrument Company in Los Angeles, California. The bridge circuit 32 is preprogrammed to provide an output on the conductor 36 whenever the resistance of the capacitor being wound is less than the predetermined resistance value and to provide an output on the conductor 37 whenever the capacitance of the capacitor being wound is at least equal to the given capacitance value.

In practicing the present invention, there are four impedance-turns conditions which may occur during the winding of a capacitor. The first condition is that a low capacitor resistance, that is, a resistance value less than a predetermined resistance value, is detected by the bridge circuit before the given capacitance value has been detected. The second, third and fourth conditions are obtained by detecting a capacitance value greater than the given value when an output is provided by the turns counter 33 indicative of the first predetermined number of turns, by detecting a capacitance value less than the given value when an output is provided by the turns counter 33 indicative of the second predetermined number of turns, or by detecting a capacitance value equal to the given capacitance value after an output has been provided by the turns counter 33 representative of the first predetermined number of turns and before an output is provided by the turns counter 33 representative of the second predetermined number of turns.

FIRST CONDITION

A resistance value of the capacitor being wound may be less than the predetermined resistance value, prior to the capacitance value of the capacitor being equal to the given value, either before or after the first predetermined number of turns has been wound onto the capacitor. Assuming that the resistance value is less than the predetermined resistance value prior to the first output from the turns counter 33, an input is provided upon initiation of the winding of a capacitor to a relay K2 from the bridge circuit 32 over the conductor 36, the relay K2 having normally open contacts 1C2 and normally closed contacts 2C2. Closure of the contacts 1C2 operates to register one count in a shorts counter 38 to record the occurrence of a low resistance condition in the capacitor being wound, while opening of the contacts 2C2 operates to disable a wrinkles counter 39, the function of which will be later explained, to prevent a wrinkled capacitor from being recorded later when in fact the defect in the capacitor is a short, or low resistance.

When the number of strip winding turns wound on the capacitor is equal to the first predetermined number of turns, the first output is provided from the turns counter 33 to energize a relay K3, the relay K3 controlling normally open contacts 1C3. Closure of the contacts 1C3 energizes a relay K4, the relay K4 having three sets of normally open contacts 1C4, 2C4 and 3C4. Closure of the contacts 1C4 registers one count in a units wound counter 41 to record the occurrence of a capacitor having been wound. As will be seen later, a count is recorded in the counter 41 for each capacitor that is wound, irrespective of which of the four impedance-turns conditions the capacitor satisfies. Closure of the contacts 2C4 applies the signal on the conductor 37 of the bridge circuit 32 to the coil of a relay K5, the relay K5 having normally open contacts 1C5 and normally closed contacts 2C5. However, since the capacitance value of the capacitor being wound has not yet reached the given capacitance value (the value cannot reach the given value if the capacitor is exhibiting a shorted, or low resistance, condition), the relay K5 is not energized.

Closure of the contacts 3C4 occurs simultaneously with closure of the contacts 2C4, and applies an energizing voltage to the coil of a relay K6 having a capacitor 42 connected thereacross and having a set of normally closed contacts 1C6. The purpose of the capacitor 42 is to increase the time required for the relay K6 to energize with respect to the time that would be required for the relay K5 to energize if an energizing voltage were present on the conductor 37 when the contacts 2C4 close, so that opening of the contacts 1C6 would occur subsequent to closure of the contacts 1C5. Energizing of the relay K6 opens the contacts 1C6.

When the number of strip winding turns applied to the capacitor being wound is equal to the second predetermined number, the second output is provided from the turns counter 33 to energize a relay K7, the relay K7 having a set of normally open contacts 1C7. Closure of the contacts 1C7 applies an energizing voltage to the coil of a relay K8, the relay K8 having normally open contacts 1C8 and normally closed contacts 2C8. Closure of the contacts 1C8 fails to record a count within the wrinkles counter 39, since the counter has previously been disabled by opening of contacts 2C2, while opening of the contacts 2C8 opens the circuit applying power to the winder motor, shown in FIG. 5, and terminates the winding of the capacitor. Opening of the contacts 2C8 also disrupts power to the relay K1, allowing the relay K1 to deenergize and to open the contacts 1C1 and 2C1.

If a resistance value below the predetermined resistance value is detected after the first predetermined number of turns have been wound on the capacitor and before the capacitance value of the capacitor is equal to the given capacitance value, relay K2 is energized. Closure of the contacts 1C2 enters one count in the shorts counter 38 and opening of the contacts 2C2 disables the wrinkles counter 39. Since the first predetermined count has already been reached and, therefore, the first output has already been provided from the turns counter 33, the relays K3, K4 and K6 are already energized, and winding of the capacitor is continued until the second predetermined number of turns have been wound thereon, at which point winding is terminated as described above.

Removal of the wound capacitor from the arbor 19 and preparation of the capacitor winding apparatus for the winding of a subsequent capacitor removes the signals being provided by the bridge circuit 32 to the conductors 36 and 37, allowing the relays K2 and K5 to deenergize if previously energized. Momentary closure of the switch 34, to initiate the winding of the capacitor, resets the turns counter 33 which in turn deenergizes the relays K3 and K7. Deenergizing the relays K3 and K7 allows the relays K4, K6 and K8 to deenergize to complete the resetting of the circuit in preparation for the winding of the capacitor.

SECOND CONDITION

If the monitored capacitance value of the capacitor being wound is greater than the given capacitance value when the first predetermined number of turns have been wound on the capacitor, a signal is provided on the conductor 37 by the bridge circuit 32 before closure of the contacts 2C4 occurs. When the number of counts advanced into the turns counter 33 is equal to the first predetermined number of turns, providing the first output therefrom, energizing of the relay K3 operates the relay K4 through the closure of the contacts 1C3. Operation of the relay K4, as previously noted, registers a count within the units wound counter 41, connects the coil of the relay K5 to the conductor 37, and applies an energizing potential to the coil of the relay K6.

Since a signal is present on the conductor 37, representative of a monitored capacitance value at least equal to the given value, and since the operating time of the relay K6 is delayed, by the capacitor 42, with respect to the operating time of the relay K5, contacts 1C5 close, before contacts 1C6 open, to store within a thin zinc counter 43 one count, which count represents a capacitor having been wound with a thin metallized strip. Energizing of the relay K5 also opens the contacts 2C5 to remove power from the winder motor to terminate winding of the capacitor.

From the foregoing description, it is seen that the purpose of delayed relay K6 is to allow a count to be stored in the thin zinc counter if the monitored value of the capacitance is greater than the given capacitance value when the first output is provided from the counter 33, but to prevent the storage of such a count if the given capacitance value is reached after the first output has been provided by the counter 33.

THIRD CONDITION

Assuming the monitored capacitance value of the capacitor being wound is less than the given capacitance value When the second predetermined number of turns have been wound thereon, a relay energizing signal is not present on the conductor 37 when the relay K3 is energized in response to the first predetermined number of counts being advanced into the turns counter 33. Energizing the relay K3 applies an energizing potential to the relay K4, through the contacts 1C3, which stores one count in the units wound counter 41 through closure of the contacts 1C4, connects the coil of the relay K5 with the conductor 37 through closure of the contacts 2C4, and applies an energizing potential to the relay K6 through closure of the contacts 3C4. Since an energizing potential is not yet present on the conductor 37, the relay K5 will not be energized to store one count within the thin zinc counter 43 by closure of the contacts 1C5 before opening of the contacts 1C6.

Continued winding of the capacitor advances into the turns counter 33 the second predetermined count, providing the second output therefrom and energizing the relay K7 to close the contacts 1C7. Closure of the contacts 1C7 energizes the relay K8, advancing one count into the wrinkles counter 39 through closure of the contacts 1C8, and removing power from the winder motor by opening of the contacts 2C8 to terminate winding of the capacitor.

FOURTH CONDITION

If the monitored capacitance value of the capacitor being wound equals the given capacitance value after the first predetermined number of turns have been wound thereon and before the second predetermined number of turns have been wound thereon, a relay energizing signal is not present on the conductor 37 when the first output is provided from the turns counter 33 to energize the relay K3 in response to the first predetermined count being advanced therein. Energizing of the relay K3 operates the relay K4 through closure of the contacts 1C3, relay K4 in turn advancing one count into the units wound counter 41 through closure of the contacts 1C4, connecting the relay K5 to the conductor 37 through closure of the contacts 2C4, and connecting the relay K6 to the source of energizing potential through closure of the contacts 3C4. Since a signal is not at this time present on the conductor 37, the relay K5 is not energized to advance one count into the thin zinc counter 43 through closure of the contacts 1C5 before the relay K6 operates to disable the thin zinc counter 43 by opening the contacts 1C6.

When the monitored value of the capacitor being wound equals the given capacitance value, a signal is provided on the conductor 37 by the bridge circuit 32 to energize the relay K5. Energizing the relay K5 closes the contacts 1C5 on the thin zinc counter 43 and removes power from the winder motor by opening the contacts 2C5 to terminate winding of the capacitor. However, closure of the contacts 1C5 does not operate to advance one count into the thin zinc counter 43 since the counter 43 had previously been disabled by opening of the contacts 1C6.

It is to be noted in the second, third and fourth conditions that, since a low resistance condition is not detected by the bridge circuit 32, relay K2 is not energized to register one count within the shorts counter 38 through closure of the contacts 1C2 or to disable the wrinkles counter 39 by opening of the contacts 2C2.

The output of each of the counters 38, 39 and 43 is applied as an input to a gate 44, the output of which controls the state of the coil of a relay K9, the relay K9 having normally closed contacts 1C9 in series with the winder motor power circuit. Whenever an output is provided from any one of the three counters to the gate 44, in response to a number of counts being advanced therein equal to the number of counts preprogrammed therein, an output is provided from the gate 44 to energize the relay K9. Energizing the relay K9 opens the normally closed contacts 1C9 and disrupts power to the winder motor to terminate the winding of the capacitor being wound and to prevent further capacitors from being wound until the relay K9 is deenergized.

The output of the units wound counter 41 is applied both as a reset to itself and as a reset to the shorts counter 38, to the wrinkles counter 39, and to the thin zinc counter 43. Therefore, whenever an output is provided from the counter 41 in response to the winding of a number of capacitors equal to the number preprogrammed within the counter 41, all of the counters 38, 39, 41 and 43 are reset to a count of zero.

The units wound counter 41 is programmed to provide an output in accordance with the number of capacitors in a given sample size, the counter 41 being advanced one count for each capacitor that is wound irrespective of whether the capacitor is ultimately acceptable or unacceptable. Each of the counters 38, 39 and 43 is programmed to provide an output in response to a predetermined number of capacitors in the sample having a particular defect to indicate that the sample as a whole is unacceptable and that corrective action must be taken by an attending operator to correct the cause of the defect. Therefore, in winding a given sample size of capacitors, if the entire sample is wound, as indicated by an output from the units wound counter 41, before an output is provided from any one of the counters 38, 39 and 43, indicative of a particular defect occurring a predetermined number of times in the given sample size, all of the counters 38, 39, 41 and 43 are reset to a zero count and winding of successive capacitors in a second sample of the given size continues.

However, if an output is provided from one of the counters 38, 39 and 43 prior to an output being provided from th counter 41, winding of further capacitors is stopped through the energization of the relay K9, the sample of capacitors being wound is rejected, and corrective action by an attending operator is taken to correct the cause of the particular type of defect which is out of control, the particular defect being indicated by the lighting of one of three lamps 46, 47 or 48 in response to an output from one of the counters 38, 39 or 43, respectively.

To reset the counters 38, 39, 41 and 43 to reinitiate capacitor winding after winding has been terminated as a result of a particular defect as indicated by an output from one of the counters 38, 39 or 43, a reset switch 49 is momentarily closed to apply a reset signal to all of the counters 38, 39, 41 and 43 to thereby deenergize the relay K9. The switch 34 is then momentarily closed to reapply power to the winder motors and to reset the relay circuitry as above described.

While one particular embodiment of the invention has been described in detail, it is understood that various other modifications and embodiments may be devised by one skilled in the art without departing from the spirit and the scope of the invention. For example, the embodiment of the invention illustrated disclosed that, in response to a monitored resistance value of the capacitor being less than a predetermined resistance value, winding of the capacitor is terminated when the second predetermined number of winding turns have been applied thereto. However, winding could likewise be terminated at the time when the monitored low resistance value is first detected, or at any other time. Also, while first and second stages in the winding of a capacitor have been determined in terms of a first and a second number of strip winding turns applied thereto, the first and the second stages could likewise be determined in terms of a first and a second period of time for which the capacitor is wound since there is a direct correlation between the number of strip winding turns applied to a capacitor and the time for which a capacitor is wound at a known winding rate. In such a case, as shown in FIG. 6, the turns counter 33 is replaced with a timer 60 capable, in response to an input thereto, to provide first and second outputs after first and second periods of time to energize the relay K3 at the end of the first period of time and to energize the relay K7 at the end of the second period of time. The timer 60 is comprised of first and second time delay relays K10 and K11, such as Potter and Brumfield Time Delay Relays No. CDB-38-70003, each of which is adjustable, by means of a variable potentiometer associated therewith, to actuate a predetermined time after an energizing signal is applied thereto. The energizing signal to the timer 60, and to each of the time delay relays K10 and K11, is provided by closure of the normally open contact 4C1 upon energization of the relay K1, which occurs when power is applied to the winder motor to initiate winding of the capacitor. As previously stated, there is a direct correlation between the number of strip winding turns applied to a capacitor and the time for which the capacitor is wound at a known winding rate. Therefore, the time delay relay K10 is adjusted to provide, through closure of an associated normally open contact 1C10, an energizing signal to the relay K3 at a first predetermined time when the first predetermined number of turns have been wound on the capacitor, and the relay K11 is adjusted to provide, through closure of an associated normally open contact 1C11, an energizing signal to the relay K7 at a second predetermined time when the second predetermined number of turns have been wound on the capacitor. In all other respects, the operation of the circuit is the same as when the turns counter 33 is employed instead of the timer 60.

What is claimed is:

1. In a capacitor winding apparatus:
   means for winding capacitor forming strips into successive capacitor rolls;
   means for monitoring the capacitance value of the capacitor being wound;
   means for determining the number of winding turns applied to each capacitor roll by the winding means; and
   means, responsive to the monitoring means and to the determining means, for determining the winding of a capacitor upon the occurrence of any one of the following:
   a. the monitored capacitance value of the capacitor reaches a given value after a first predetermined number of monitored turns have been wound on the capacitor and before a second, and greater, predetermined number of monitored turns have been wound on the capacitor;
   b. the monitored capacitance value is greater than the given value when the first predetermined number of monitored turns have been wound on the capacitor; or
   c. the monitored capacitance value is less than the given value when the second predetermined number of monitored turns have been wound on the capacitor.

2. In a capacitor winding apparatus:
   means for winding capacitor forming strips into successive capacitor rolls;
   means for monitoring the capacitance value of the capacitor being wound;
   means for determining the amount of time during which the capacitor is wound;
   means, responsive to the monitoring means and to the determining means, for terminating the winding of a capacitor upon the occurrence of any one of the following:
   a. the monitored capacitance value of the capacitor reaches a given value after a first predetermined period of time and before a second, and greater, predetermined period of time;

b. the monitored capacitance value is greater than the given value at the first predetermined period of time; or c. the monitored capacitance value is less than the given value at the second predetermined period of time.

3. A method of winding a capacitor roll to a predetermined capacitance value from capacitor forming strips, which comprises the following sequential steps:

winding the strips to form a capacitor;

monitoring the capacitance value of the capacitor being wound;

monitoring the number of strip winding turns wound on the capacitor;

stopping the winding of the capacitor when the monitored number of winding turns is at a predetermined number of turns, if at that point the monitored value of the capacitance is greater than the predetermined capacitance value;

continuing to wind the capacitor when the predetermined number of winding turns is reached if at that point the monitored capacitance value of the capacitor is less than the predetermined capacitance value, and terminating the winding of the capacitor when the monitored capacitance value of the capacitor is at the predetermined capacitance value.

4. A method of winding a capacitor roll to a predetermined capacitance value from capacitor forming strips, which comprises:

winding the strips to form a capacitor;

monitoring the capacitance value of the capacitor being wound;

monitoring the value of the resistance of the capacitor being wound;

monitoring the number of strip winding turns wound on the capacitor, and stopping the winding of the capacitor when any one of the following conditions occurs:

a. the monitored value of the resistance of the capacitor is less than a predetermined resistance value;

b. the monitored number of winding turns is at a first predetermined number of turns, if at that point the monitored value of the capacitance is greater than the predetermined capacitance value;

c. the monitored number of turns is at a second predetermined number, the second predetermined number being greater than the first predetermined number, if at that point the monitored capacitance value of the capacitor is less than the predetermined capacitance value, or d. the monitored value of the capacitor is at the predetermined capacitance value, and at that point the monitored number of turns is between the first and the second predetermined number of turns.

5. A method of winding a capacitor roll to a predetermined capacitance value from capacitor forming strips, which comprises the following sequential steps:

winding the strips to form a capacitor;

monitoring the capacitance value of the capacitor being wound;

determining the time for which the capacitor is wound;

stopping the winding of the capacitor when the capacitor has been wound for a predetermined time, if at that time the monitored capacitance value is greater than the predetermined capacitance value;

continuing to wind the capacitor after the predetermined time if at that time the monitored capacitance value is less than the predetermined capacitance value, and terminating the winding of the capacitor when the monitored capacitance value of the capacitor is at the predetermined capacitance value.

6. A method of winding a capacitor roll to a predetermined capacitance value from capacitor forming strips, which comprises:

winding the strips to form a capacitor;

monitoring the capacitance value of the capacitor being wound;

monitoring the value of the resistance of the capacitor being wound;

determining the time for which the capacitor is wound, and stopping the winding of the capacitor when any one of the following conditions occurs:

a. the monitored value of the resistance of the capacitor is less than a predetermined resistance value;

b. the time for which the capacitor has been wound is at a first predetermined time, if at that time the monitored capacitance value is greater than the predetermined capacitance value;

c. the time for which the capacitor has been wound is at a second predetermined time, the second predetermined time being greater than the first predetermined time, if at the second predetermined time the monitored capacitance value is less than the predetermined capacitance value, or d. the monitored value of the capacitance is at the predetermined capacitance value, and at that point the time for which the capacitor has been wound is between the first and second predetermined time.

* * * * *

UNITED STATES PATENT OFFICE
CERTIFICATE OF CORRECTION

Patent No. 3,797,771          Dated March 19, 1974

Inventor(s) D. R. Brown-O. T. Masopust, Jr.

It is certified that error appears in the above-identified patent and that said Letters Patent are hereby corrected as shown below:

Column 2, starting with "The number" and ending with "preselected number", lines 54-64 should have been deleted. Column 3, line 56, "stip" should read --strip--. Column 4, line 34, "to" should read --of--. Column 7, line 42, "When" should read --when--. Column 9, line 18, "th" should read --the--. Column 10, line 35, "determining" second occurrence should read --terminating--.

Signed and sealed this 10th day of September 1974.

(SEAL)
Attest:

McCOY M. GIBSON, JR.
Attesting Officer

C. MARSHALL DANN
Commissioner of Patents